(12) United States Patent
Matousek et al.

(10) Patent No.: US 10,426,089 B2
(45) Date of Patent: Oct. 1, 2019

(54) FEEDER HAVING LATERAL TILT FOR AN AGRICULTURAL HARVESTING COMBINE

(71) Applicant: Tribine Industries LLC, Logansport, IN (US)

(72) Inventors: Robert A Matousek, Valley Center, KS (US); Treg Shidler, Clay City, IN (US); Martin E. Pruitt, Hesston, KS (US); Darren J. Nelson, Hutchinson, KS (US); Dillon M. Thompson, Newton, KS (US)

(73) Assignee: Tribine Industries LLC, Logansport, IN (US)

( * ) Notice: Subject to any disclaimer, the term of this patent is extended or adjusted under 35 U.S.C. 154(b) by 75 days.

(21) Appl. No.: 15/621,218

(22) Filed: Jun. 13, 2017

(65) Prior Publication Data
US 2018/0007832 A1 Jan. 11, 2018

Related U.S. Application Data

(60) Provisional application No. 62/358,618, filed on Jul. 6, 2016.

(51) Int. Cl.
| | |
|---|---|
| *A01D 41/14* | (2006.01) |
| *A01F 12/46* | (2006.01) |
| *A01D 41/16* | (2006.01) |
| *A01F 12/10* | (2006.01) |
| *A01D 75/28* | (2006.01) |
| *A01D 75/18* | (2006.01) |

(52) U.S. Cl.
CPC .......... *A01D 41/145* (2013.01); *A01D 41/16* (2013.01); *A01D 75/287* (2013.01); *A01F 12/10* (2013.01); *A01F 12/46* (2013.01); *A01D 75/187* (2013.01)

(58) Field of Classification Search
CPC .... A01D 75/287; A01D 41/16; A01D 34/008; A01D 41/145; A01D 41/14; A01D 41/141; A01D 75/285; A01B 63/004; A01B 63/108; A01B 63/32
See application file for complete search history.

(56) References Cited

U.S. PATENT DOCUMENTS

| | | | | |
|---|---|---|---|---|
| 2,904,949 | A * | 9/1959 | Bell | A01D 41/14 56/209 |
| 3,731,470 | A * | 5/1973 | Cornish | A01D 75/285 280/124.128 |
| 4,266,395 | A * | 5/1981 | Basham | A01D 75/287 56/16.2 |
| 5,918,448 | A * | 7/1999 | Wheeler | A01D 75/287 56/10.2 E |

(Continued)

*Primary Examiner* — Arpad Fabian-Kovacs
(74) *Attorney, Agent, or Firm* — Mueller Law, LLC; Jerry K. Mueller, Jr.

(57) ABSTRACT

An improved feeder house assembly has a front end header adapter assembly formed from a front hook assembly for carrying a grainhead and a front header cradle assembly supporting the front hook assembly and including a pair of frame assemblies, each frame assembly having mated top domed surfaces. One of the frame assemblies is stationary and the other frame assembly has laterally tilting along the mated top domed surfaces along an arc of rotation by a pair of linear actuators located at either top side of the front end header adaptor and tangential to the arc of rotation.

6 Claims, 16 Drawing Sheets

(56) References Cited

U.S. PATENT DOCUMENTS

| | | | | |
|---|---|---|---|---|
| 6,510,680 | B2 * | 1/2003 | Uhlending | A01D 75/287 56/10.2 E |
| 7,360,351 | B2 * | 4/2008 | Rickert | A01D 41/144 56/228 |
| 9,717,181 | B2 * | 8/2017 | Boyd, III | A01D 41/16 |
| 2002/0017090 | A1 * | 2/2002 | Hockenbeck | A01B 63/32 56/16.2 |
| 2016/0278276 | A1 * | 9/2016 | De Coninck | A01B 63/004 |
| 2017/0013778 | A1 * | 1/2017 | Borry | A01D 41/145 |
| 2017/0311545 | A1 * | 11/2017 | Walter | A01B 63/108 |

* cited by examiner

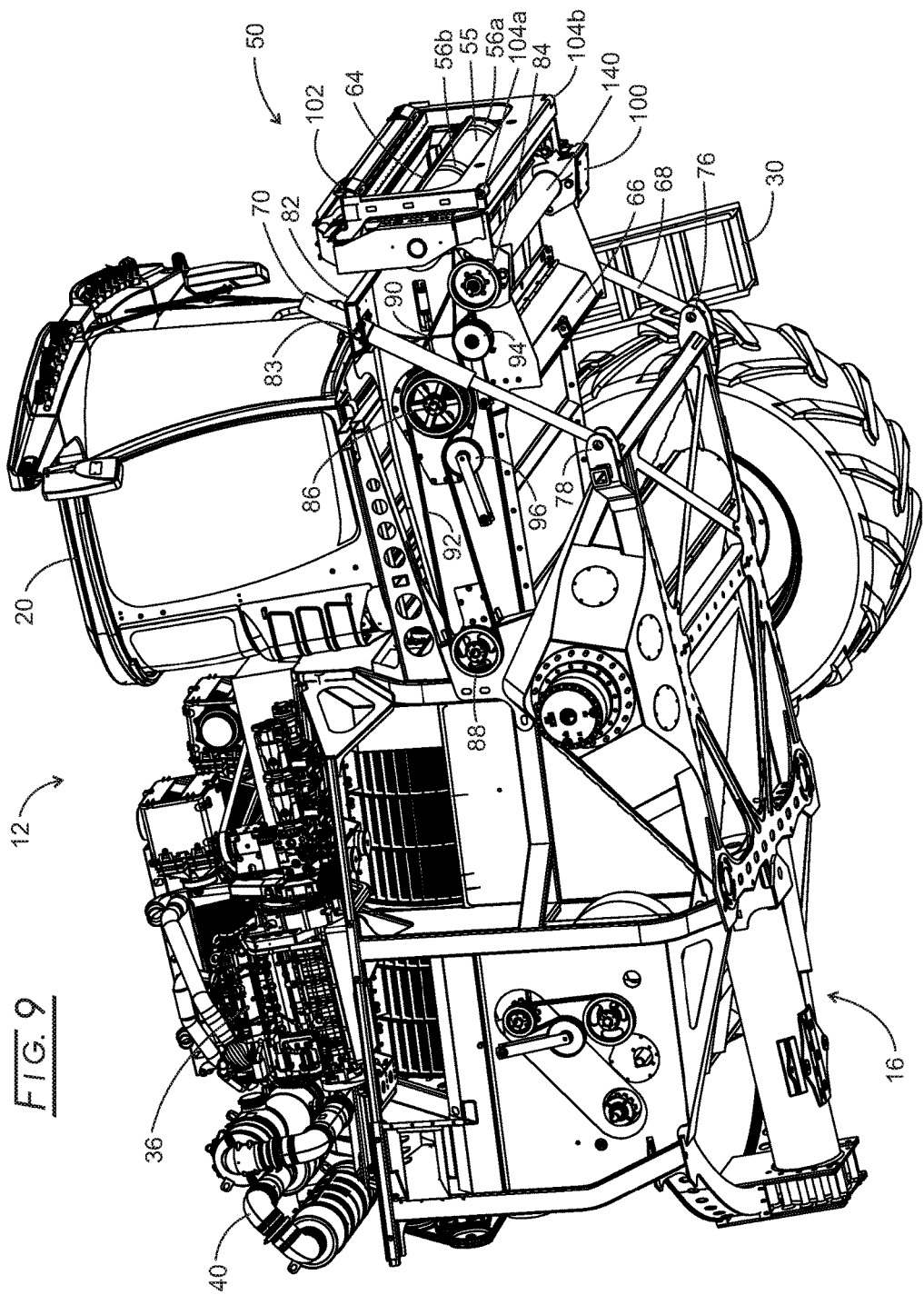

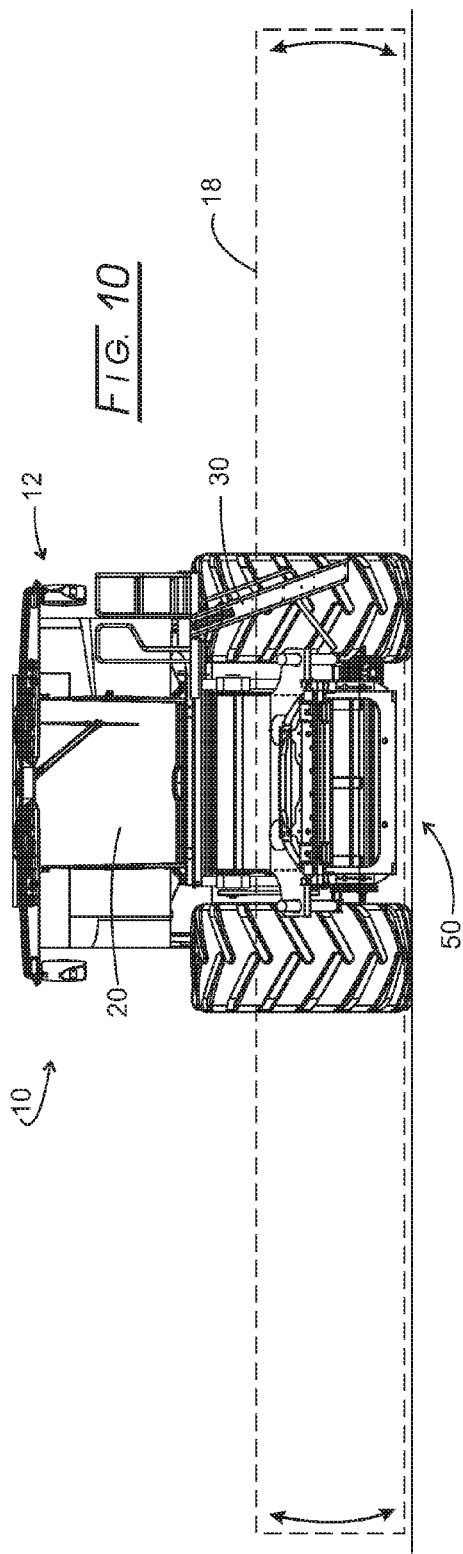
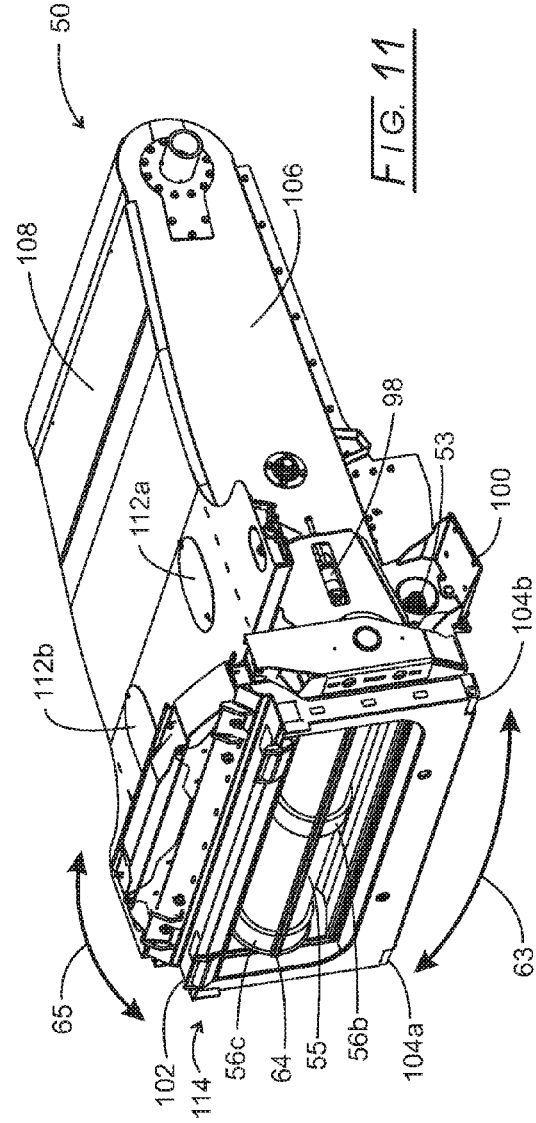

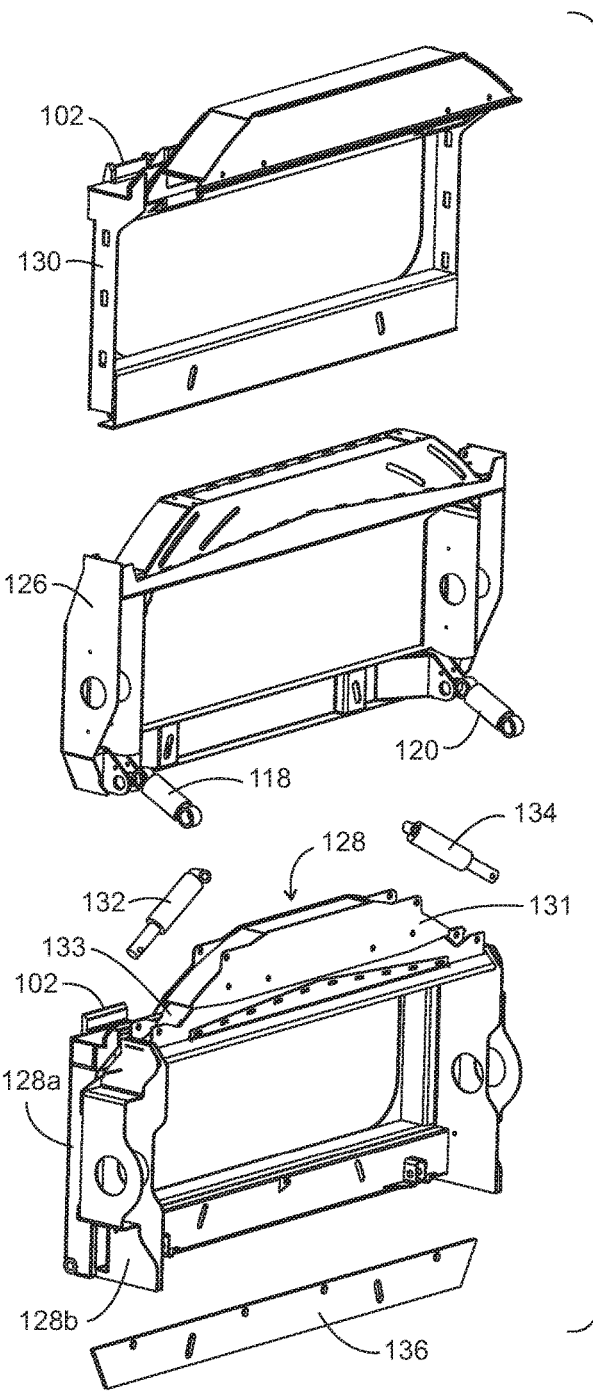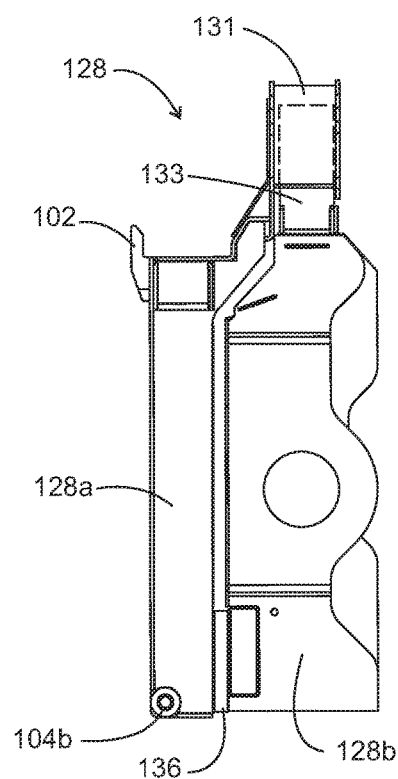

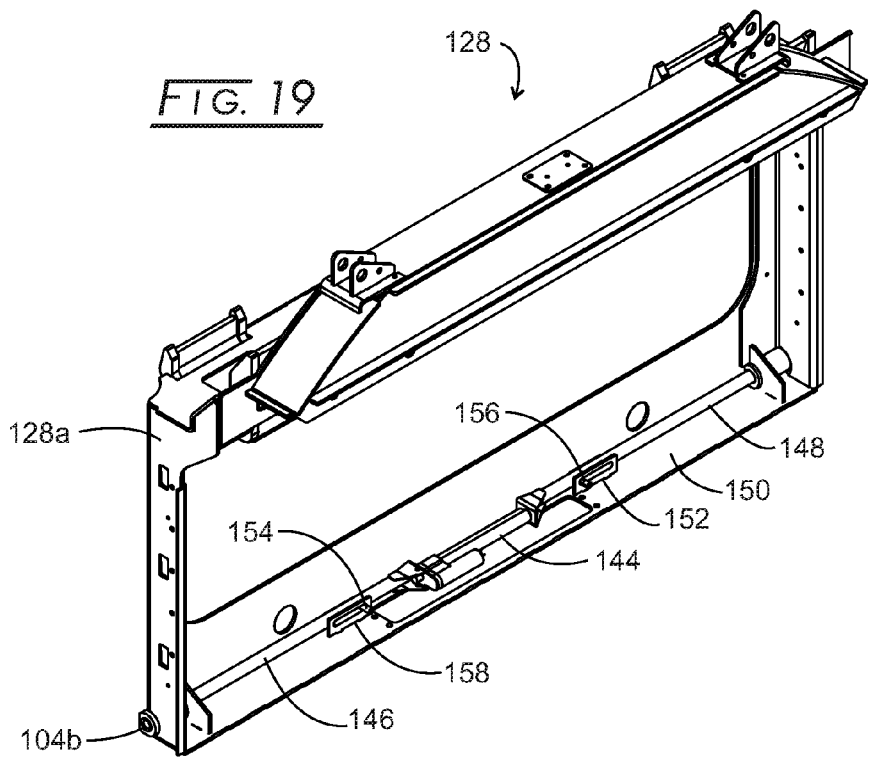
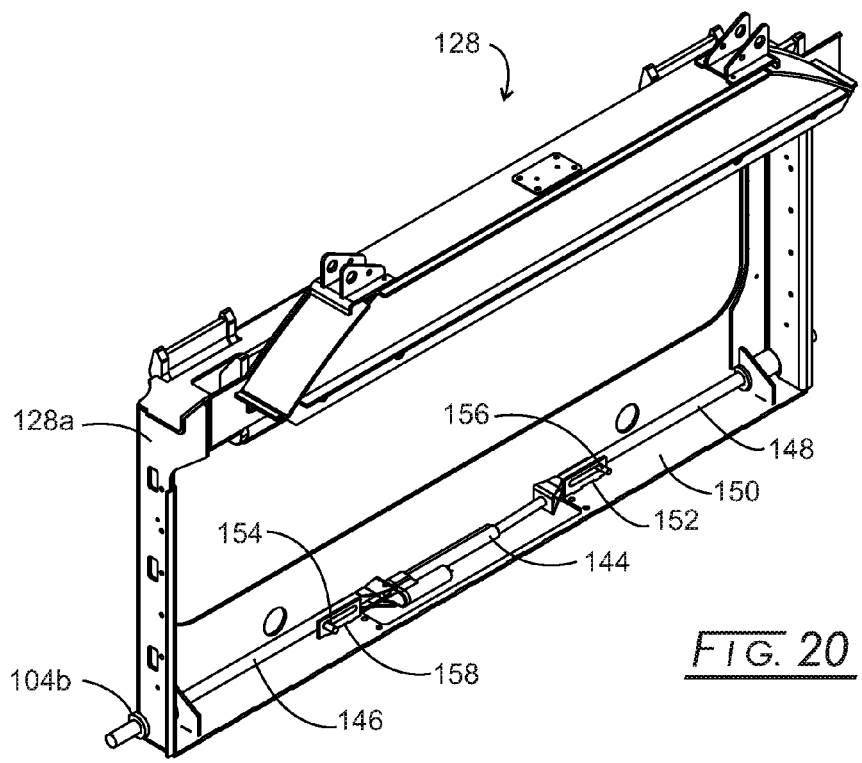

FEEDER HAVING LATERAL TILT FOR AN AGRICULTURAL HARVESTING COMBINE

CROSS-REFERENCE TO RELATED APPLICATIONS

This application claims benefit of provisional application Ser. No. 62/358,618 filed on Jul. 6, 2017; and is cross-referenced to application Ser. No. 14/946,827 filed Nov. 20, 2015; Ser. No. 14/946,842 filed Nov. 20, 2015; and Ser. No. 14/967,691, filed on Dec. 14, 2015.

STATEMENT REGARDING FEDERALLY SPONSORED RESEARCH

Not applicable.

BACKGROUND

The present disclosure relates to harvesting articulated (jointed) combines and more particularly to improved an improved feeder assembly having lateral tilt and carried by the forward tractor or crop processing power unit (hereinafter, "PPU").

As the typical commercial combine harvester gets ever larger, it is asked to lift wider and wider headers on its front via the feeder house. The increased weight of the headers with increased size can challenge the header lift, lateral tilt, and fore/aft mechanisms, as well as the feeder house structure in general. Aggravating these structures and applied force situations is the lift geometry of the hydraulic lift cylinders that typically are configured such that when pushing the feeder house upward they actually will apply a larger proportion of their force in a horizontal direction (horizontal force vector) versus the vertical component of the force (vertical force vector) that is causing vertical movement or lift of the feeder house.

With respect to the side-to-side tilting mechanisms common to the industry and with reference to the feeder house lift condition explained above, while the weight of the header is applied to the top outside portions of the feeder house front structure, the weight is typically carried by either the top middle, or bottom middle of the structural rectangle where it is "pinned" to provide the pivot for the tilting of the load carrying front face adaptor of the feeder front face. As the feeder house gets wider, this requires significant structural strength to provide a beam (top or bottom) that supports the heavy header in the middle, and then severely weakens the beam by cutting a hole in it to allow the pin hinge. Of course, the heavier the prospective load, the larger the hinge pin must be, and so the beam gets deeper and deeper for structural strength in an area where that depth is a deterrent to good overall design practice.

Accordingly, this disclosure proposes to solve the problem of unfortunate cylinder force vectors by applying the lift forces of the cylinders to the top-front area of the feeder instead of to the bottom front structures. Also, by anchoring the cylinders significantly forward (versus typical designs) of the front axle location, the net effect is to have lift cylinders that are significantly more vertical in their applied force to the feeder house structure. This also is a good configuration given that the heavy weight of the header is supported at the top of the front of the feeder in the "cradle" that engages the top beam of the header. Such cylinder lift configuration also could have use for swathers, forage harvesters, and other crop cutting assemblies carried on the front of a tractor. Concurrently, the disclosed feeder assembly will support the header and allow side-to-side oscillation (lateral tilt) by means of allowing a curved top surface on the front of the feeder to be saddled by a curved dome that sets down atop and around the curved top of the feeder front; thus, describing an arc of curvature as the dome is pushed to one side or another.

BRIEF SUMMARY

This disclosure solves the problem of unfortunate cylinder force vectors by applying the lift forces of the cylinders to the top-front area of the feeder instead of to the bottom front structures. Also by anchoring the cylinders significantly forward (versus typical designs) of the front axle location, the net effect is that the lift cylinders are significantly more vertical in their applied force to the feeder. This also is a good configuration given that the heavy weight of the header is supported at the top of the front of the feeder in the "cradle" that engages the top beam of the header.

One aspect of this disclosure, then, is a lifting assembly for a crop severing assembly forwardly carried by a tractor having a frame and an axle assembly carrying front wheel assemblies. The crop severing assembly has a forward end and a rear end. The disclosed lifting assembly includes a pair of bracket assemblies located at the forward end and atop the crop severing assembly. A pair of lift cylinder assemblies each has a lower end and a top end. The cylinder lower ends are located at either side of the rear end of the crop severing assembly and are attached to bottom brackets extending from the tractor frame forward of the tractor axle assembly. Each cylinder top end is attached to a trunnion carried by one of the crop severing bracket assembly for pivotally raising and lowering of the forward end of the crop severing assembly.

Concurrently, this disclosure supports the header and allows side-to-side oscillation (lateral tilt) by means of allowing a curved top surface on the front of the feeder to be saddled by a curved dome that sets down atop and around the curved top of the feeder front; thus, describing an arc of curvature as the dome is pushed to one side or the other.

Disclosed, then, is a feeder house assembly for accepting severed crop for processing by a harvesting combine having a front axle assembly and a frame. The feeder house assembly has a forward assembly at its forward end, a rear end, a lengthwise extent, a width, a top sheet, and a bottom sheet. The forward assembly supports a grainhead and has a front opening for receiving crop material severed by the grainhead and a rear opening at its rear end for passing severed crop material to within the harvesting combine for threshing of the severed crop material. A conveyor assembly extends from the front opening to the rear opening for moving severed crop material along the lengthwise extent between a counter-clockwise moving conveyor assembly and the bottom sheet. A pair of cylinders are attached at either side of the feeder house assembly at the top of the front of the feeder house and to bottom brackets extending from the harvesting combine frame forward of the harvesting combine axle assembly for pivotally raising and lowering of the forward end of the feeder house assembly.

These are other features will be described in detail below.

BRIEF DESCRIPTION OF THE DRAWINGS

For a fuller understanding of the nature and advantages of the present method and process, reference should be had to the following detailed description taken in connection with the accompanying drawings, in which:

FIG. 9 is a bottom isometric view like that in FIG. 8, but of the opposite side shown in FIG. 8;

FIG. 10 is a front view of the forward PPU with a header shown in phantom;

FIG. 11 is an isometric view of the disclosed feeder assembly;

FIG. 14 is an exploded isometric view of that in FIG. 13, but with the curved dome assembly in position on the header cradle;

FIG. 15 is a side view of the curved dome assembly of FIG. 11;

FIG. 19 is a front isometric view of the curved dome assembly showing the locking mechanism for the grainhead in an unlocked position;

FIG. 20 is a front isometric view of the curved dome assembly showing the locking mechanism for the grainhead in a locked position;

The drawings will be described in greater detail below.

DETAILED DESCRIPTION

Referring initially to FIGS. 1, 2, 3, and 4, an articulated harvester, 10, consists of a forward powered PPU, 12, a rear grain cart, 14, and an articulation joint, 16, that connects PPU 12 with rear grain cart 14. The details of articulation joint 16 are disclosed in commonly owned application Ser. No. 14/946,827 filed Nov. 20, 2015. PPU 12 carries a grainhead, 18, shown in a down harvesting position in FIG. 1 and in an up non-harvesting position in FIG. 3, operator's cab, 20, grain cleaning and handling assembly, and engines. PPU 12 is devoid of any grain storage, such being exclusive in rear grain cart 14. While both PPU 12 and rear grain cart 14 are shown being carried by wheel assemblies, one or both could be tracked. A screened air inlet, 15, is located atop PPU 12 where the air likely is the cleanest around harvesting combine 10.

An off-loading auger assembly, 22, is in the folded home position and is carried by rear grain cart 14. Grain cart 14 also supports a foldable roof, 24, shown in an open position, but which can fold inwardly to cover grain stored in rear grain cart 14. Foldable roof 24 may be made of metal, plastic, or other suitable material, but may be made of durable plastic for weight reduction and easy folding/unfolding. A grain storage bin, 28, is housed within grain cart 14 and also may be made of plastic also in keeping with desirable weight reduction; although, it could be made of metal at the expense of weight. All plastic parts may be filled with particulate filled or fiber reinforced in conventional fashion and could be laminate in construction. Further details on rear grain cart 14 can be found commonly owned application Ser. No. 14/946,842 filed Nov. 20, 2015.

Figure 1:
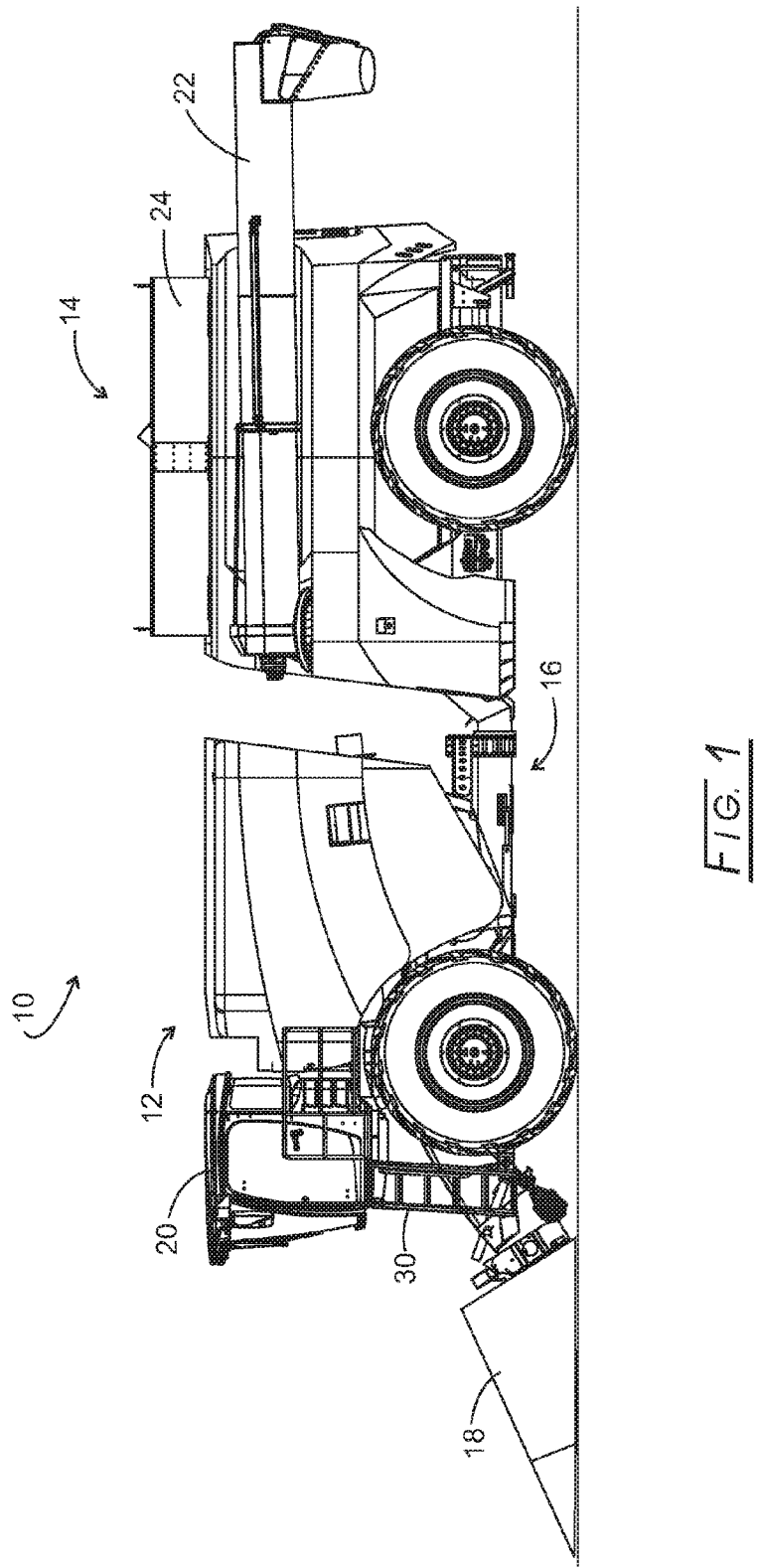
FIG. 1 is a side elevation view of an articulated combine of a forward crop processing unit (PPU), articulation joint, and grain cart, where the grainhead is down in a crop harvesting position.
Figure 2:
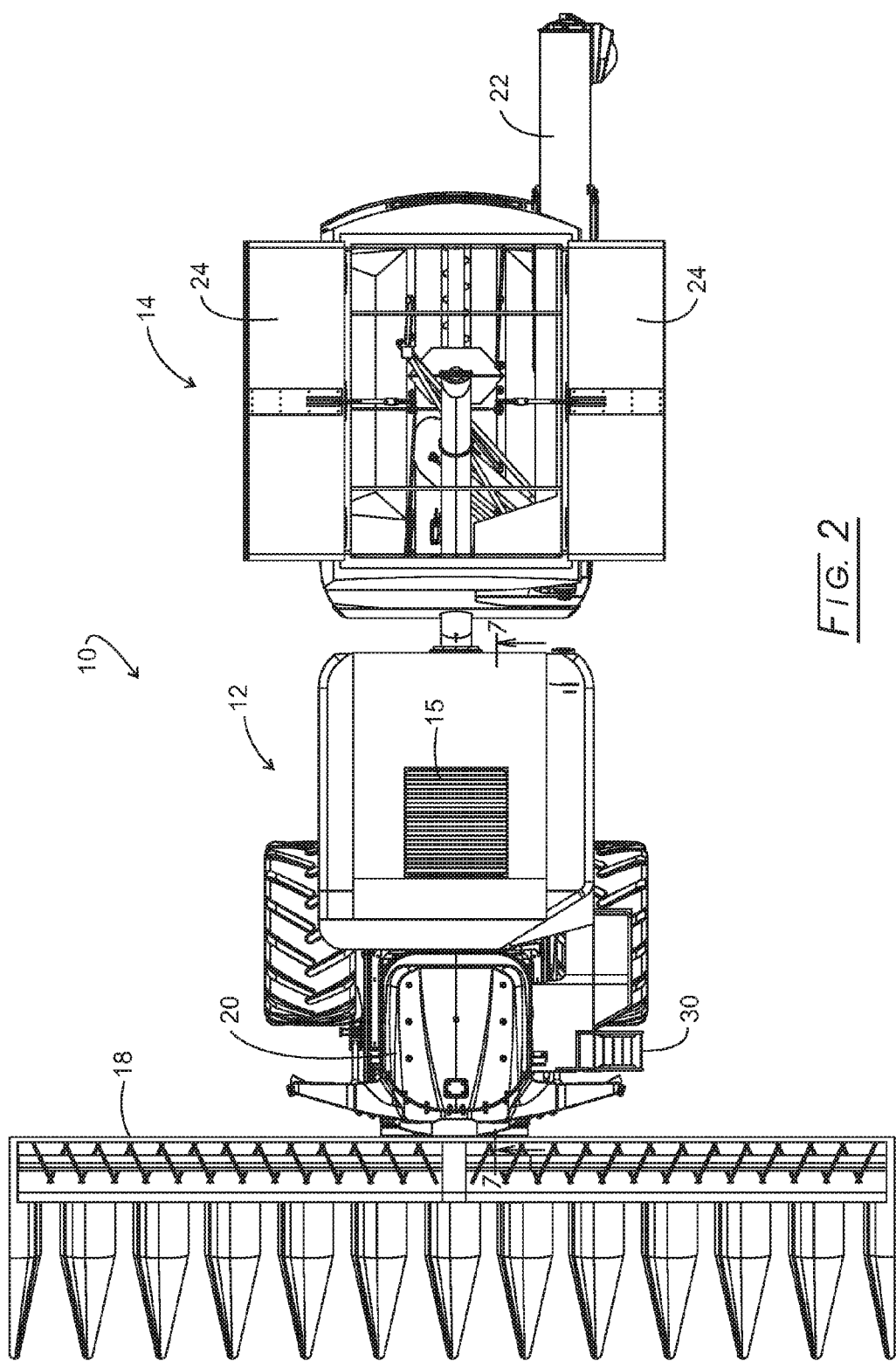
FIG. 2 is an overhead view of the articulated combine of FIG. 1.
Figure 3:
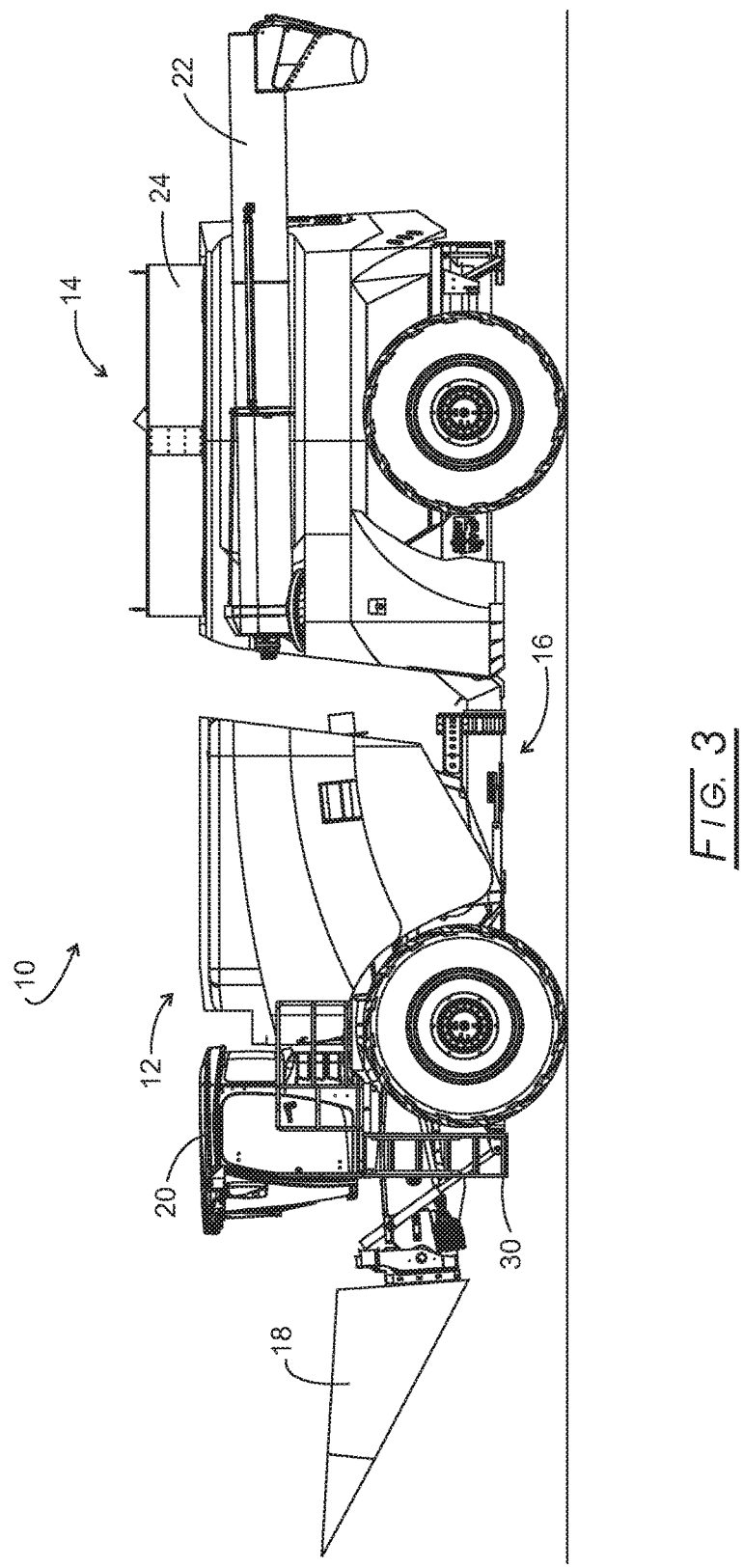
FIG. 3 is a side view of the articulated combine of FIG. 1, where the grainhead is in an up, non-grain harvesting position.
Figure 4:
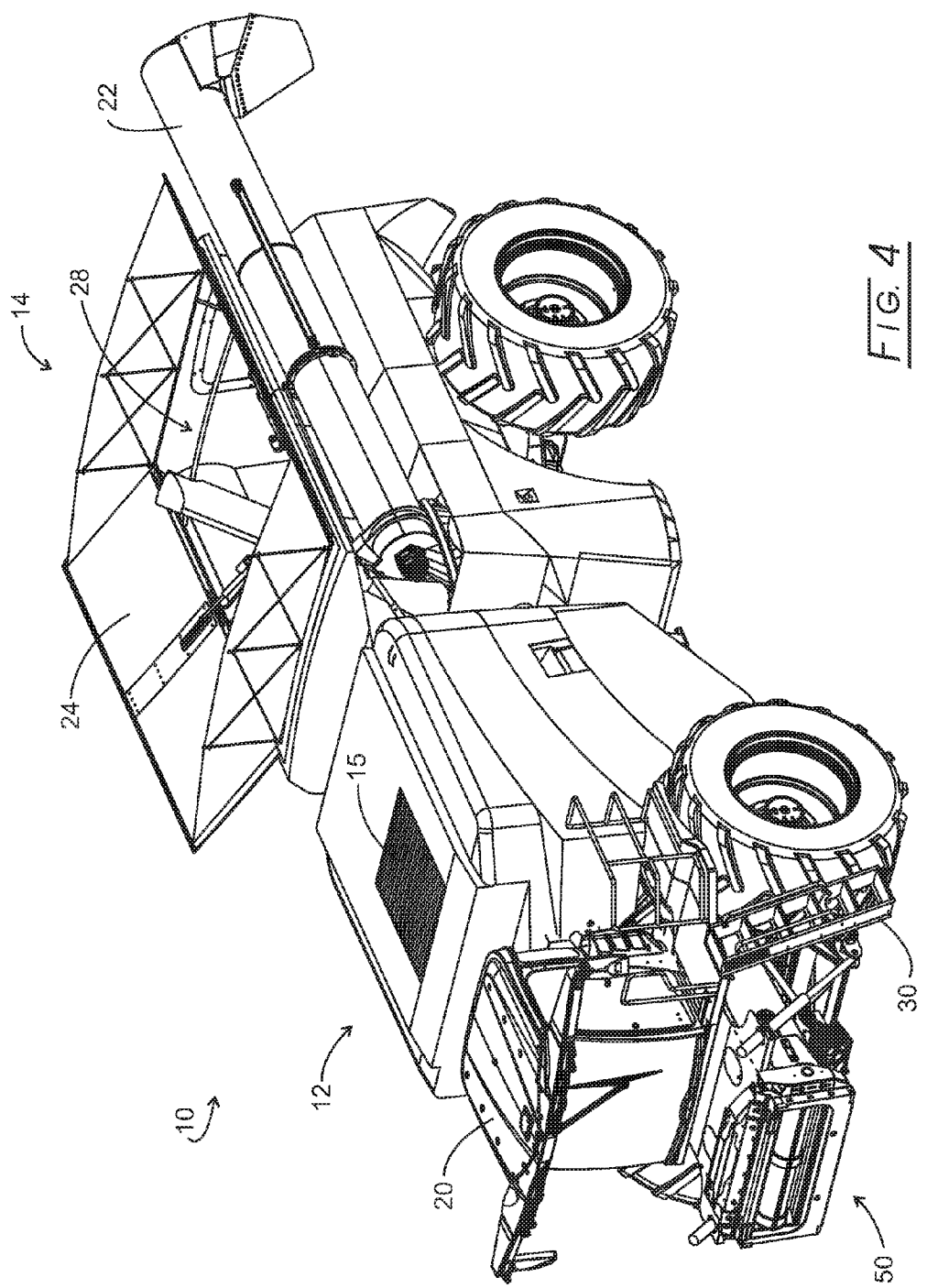
FIG. 4 is an isometric view of the PPU of FIG. 1 with the grainhead removed for viewing the disclosed feeder assembly.
Figure 5:
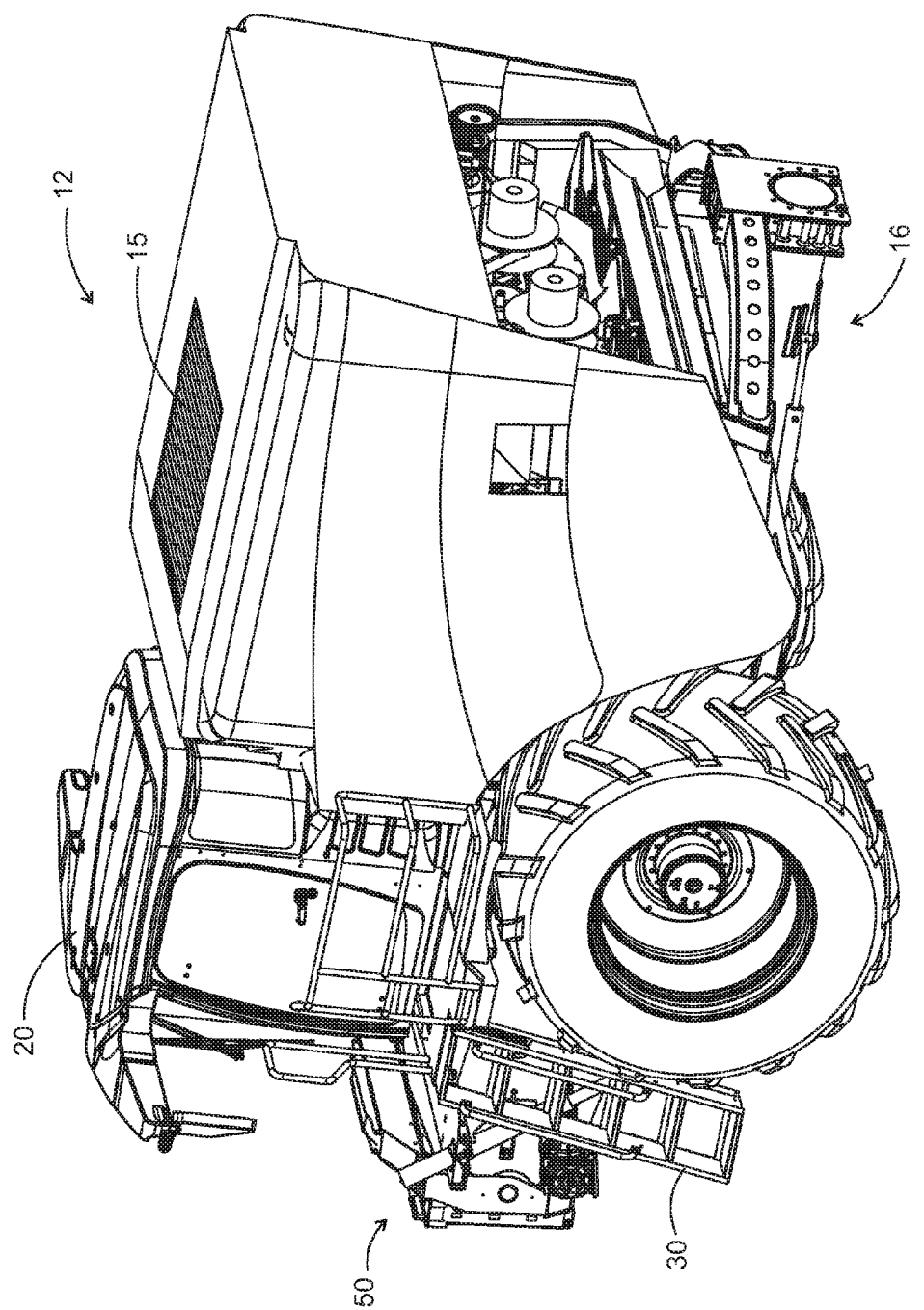
FIG. 5 is the isometric view of only the PPU from the rear.
Figure 6:
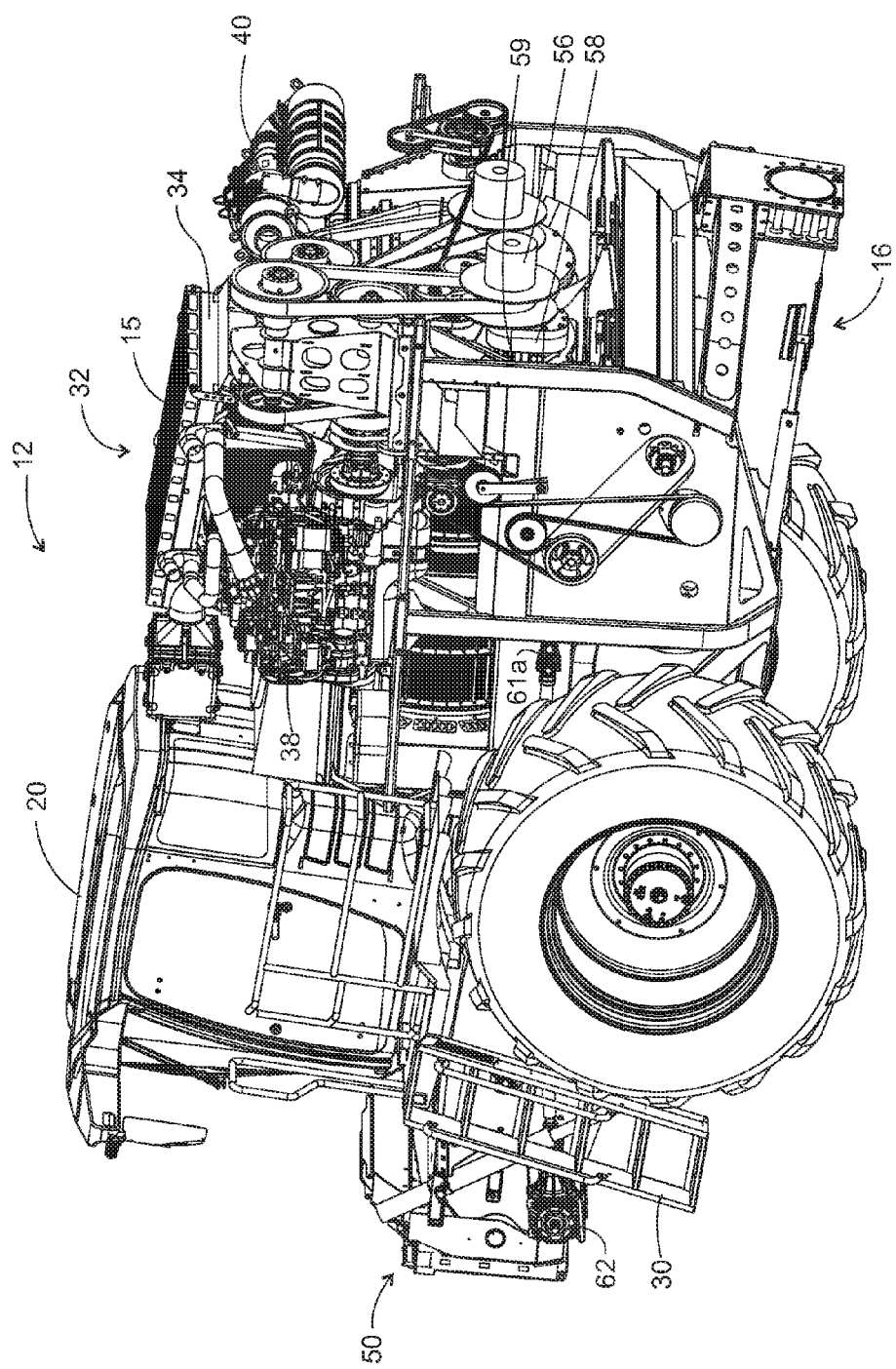
FIG. 6 is an isometric view like FIG. 5, but with the outer shell or skin removed from the PPU.

The operator is granted access to cab 20 by a stair assembly, 30, that extends upwardly from just above the ground and will be more fully disclosed in commonly owned application Ser. No. 15/654,786, filed Jul. 20, 2017 (U.S. 62/375,986, filed Aug. 17, 2016). The skin or shell has been removed in FIG. 6 to reveal components housed within PPU 12. A fan assembly, 32, is located centrally for air to enter through screened air inlet 15. This location was chosen, as it arguably will be the cleanest flow of air around PPU 12. Radiators, as typified by a main cooling system air box, 34, surround fan assembly 32 and are coolingly connected with a pair of engines, 36 and 38, located on either side of main cooling fan assembly 32. Engine 36 powers the hydraulics for articulated combine 10, while engine 38 powers all other components of articulated combine 10. Exhaust after treatment assembly, 40, cleans air for emission control. When firing up the engines, which typically will be diesel engines, engine 38 is started first so that coolant flowing through engine 38 will warm up engine 36 and the hydraulic fluid for articulated combine 10. The twin engines aspect will be described in detail in commonly owned application Ser. No. 15/643,685, filed Jul. 7, 2017 (U.S. 62/358,629 filed Jul. 6, 2016; now, U.S. Pat. No. 10,257,977) and the airflow will be described in detail in commonly owned application Ser. No. 15/642,799, filed Jul. 6, 2017 (U.S. 62/358,629 filed Jul. 6, 2016). Other components visible in FIG. 6 will be described in detail in the referenced applications.

Grainhead 18 (see FIGS. 1-3) typically will be between about 30 and 50 feet wide and severs the crop in various fashions from its stalk or its attachment to earth. Grainhead 18 is carried by a feeder assembly, 50, which conveys the severed crop consisting of both stalk and grain. By convention in the industry and herein, all material that is not grain is referred to as "Material Other than Grain" or, simply, "MOG".

Figure 7:
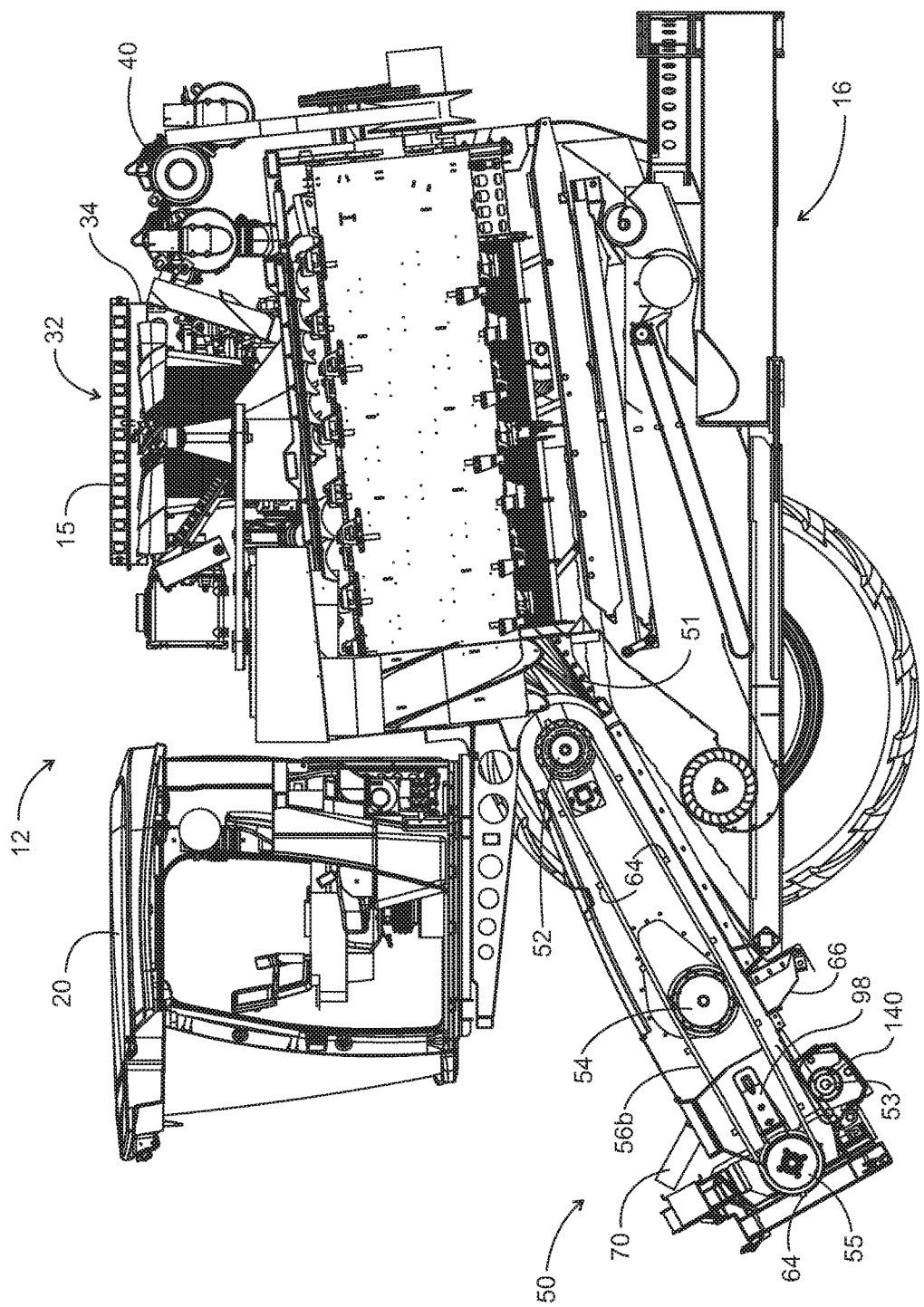
FIG. 7 is a sectional view through line 7-7 of FIG. 2.

Progressing rearwardly and looking to FIG. 7, the crop material reaches the end of feeder assembly 50 at velocity and is projected rearwardly and upwardly onto the walls of a transition cone, which is a robust structure that describes shape and direction of material flow and generally funnels the flow of crop material toward both sides and the bottom of a rotor inlet. The remaining details of the concaves assembly will be found in commonly owned application Ser. No. 14/967,691, filed on Dec. 14, 2015. Feeder house assembly 50 is described in great detail in commonly owned application Ser. No. 15/621,218, filed Jun. 13, 2017 (U.S. 62/358,618 filed Jul. 6, 2017).

Figure 8:
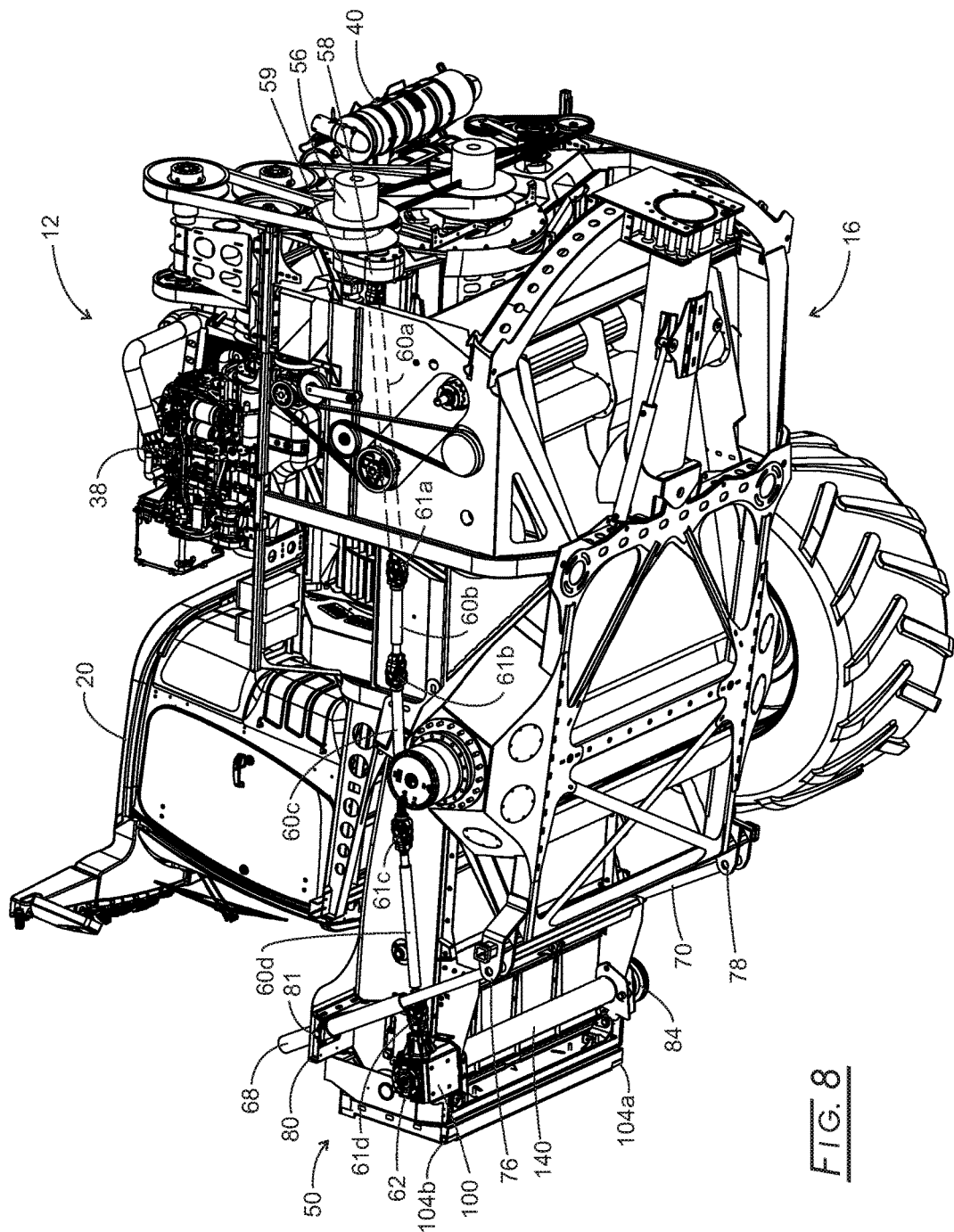
FIG. 8 is a bottom isometric view of the PPU with the skin, ladder platform, and wheel removed therefrom.

Returning to FIG. 6, a pulley assembly, 56, that includes a clutch and gearbox assembly, 58, is driven by engine 38 and provides power to feeder assembly 50. A reverser motor, 59, is located adjacent to clutch and gearbox assembly 58 for reversing feeder 50. Referring also to FIG. 8, a shaft assembly (drive shaft and u-joints and a transfer case) is revealed in the interior of PPU 12, and includes drive shafts, 60a-60d, and U-joints cases, 61a-61d, and a gearbox/transfer case, 62. Of course, the number of drive shafts and U-joints could be greater or less in number. Regardless, power to feeder assembly 50 from engine 38 is achieved in this fashion; although, other schemes and assemblies could provide power to feeder assembly 50, as is appreciated by the skilled artisan. The drive shaft assemblies terminate at gearbox 62 from where power to feeder house 50 is obtained and described later herein.

Referring now to FIG. 7, crop material severed by grainhead 18 is conveyed upward and rearward by feeder assembly 50, which consists of a rear roller assembly, 52, rock beater roller assembly 54, and a front roller assembly, 55. In the embodiment in the drawings, 3 equally spaced-apart belts, 56a, 56b, and 56c (see FIGS. 8 and 16 also), fit over the 3 roller assemblies and carry transversely (transverse with reference to the direction of travel of harvesting combine 10) mounted flights, with a transverse flight, 64, being typical of such transverse flights, whose purpose includes to pull along the harvested grain material, which effectively forms a mat. The direction of travel of feeder assembly 50 rollers and belts is in a direction such that harvested grain is located on the bottom of feeder assembly 50. One of the unique properties of feeder assembly 50 is that it is pushed relatively far back into PPU 12 and closer to the concaves assembly than is seen in traditional harvesting combines. Another uniqueness is that the rock beater assembly is pulled relatively forward of its traditional location, making it much easier to access for discharging accumulated rocks and debris, servicing, and repair. A rock beater roller assembly, 54, is located in front of the wheels of PPU 12 and in a relatively open location. While 3 belts carrying cleats or slats, typified by a cleat, 57, (see FIG. 16), that span laterally across the 3 belts are shown in the drawings, a current embodiment uses 4 such belts with a staggered pattern of cleats, each spanning between only 2 belts. It will be appreciated that the number of belts and pattern or cleats is a matter of design choice and not a limitation of the present disclosure.

Because harvesting combine 10 will be used in fields that undulate in both directions, grainhead 18 will need to be adjustable both side-to-side and heel-to-toe (forward and backward tilting) in order to keep on the ground for maximizing grain harvesting. This need translates into feeder assembly 50 needs to tilt side-to-side and heel-to-toe, as indicated by arrows 63 and 65, respectively in FIG. 11.

FIG. 8 reveals cylinder assemblies, 68 and 70 (see FIG. 9), that provide the lift movement of feeder assembly 50 for raising and lowering grainhead 18. Lift cylinder assembly 68 is pivotally attached at its bottom to a bracket assembly, 76, and lift cylinder assembly 70 is attached at its bottom to a bracket assembly, 78; and at their tops, respectively to bracket assemblies, 80 and 82. Bracket assemblies 76 and 78 attach to the frame, 17, of PPU 12, while bracket assemblies 80 and 82 are attached at the top of feeder assembly 50 at its forward end. Bracket assemblies 80 and 82 extend significantly in front of the axle (and wheels/tires) of PPU 12, providing an anchor location to be closer to the front of feeder assembly 50. Since bracket assemblies 80 and 82 are attached to frame 17 of PPU 12, there is a more direct transfer of the lifting forces of feeder house assembly 50 from cylinder assemblies 68/70 through frame 17 and PPU 12 wheel assemblies to the ground. Bracket assemblies 80 and 82 are atypically located relatively close to the forward end of feeder assembly 50, also making the top anchor location for cylinder assemblies 68/70 relatively close to the forward end of feeder assembly 50. Coincidentally and necessarily, such design requires the use trunnions, 81 and 83, to mount cylinder assemblies 68/70, where bracket assemblies 80/82 carry trunnions 81/83. Moreover, trunnions 81/83, respectively, are connected to cylinder assemblies 68/70 not at the cylinder ends, but are located some distance down on the cylinder tube, as can be seen in, for example, FIGS. 8 and 9. Thus, the stroke length of the cylinder assemblies 68/70 can be much greater than the actual length of the cylinders compared anchoring the upper ends of the cylinders at their ends. The net of such design is that cylinder assemblies 68/70 are oriented more vertically than conventional cylinder mounting designs. Such more nearly perpendicular cylinder mounting to feeder assembly 50 and, therefore, the force exerted on feeder assembly 50 by cylinder assemblies 68/70, has a much greater percentage of its linear force being used to vertically lift feeder assembly 50, as opposed to pushing feeder assembly 50 horizontally away from PPU 12.

Figure 12:
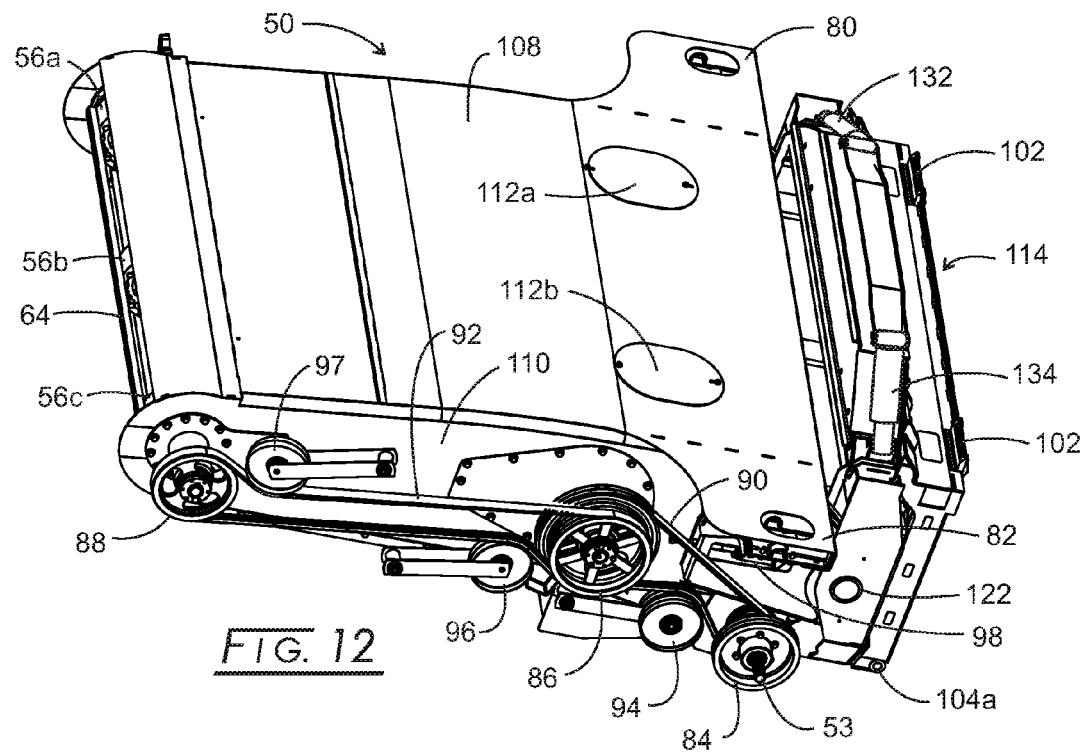
FIG. 12 is a top isometric view of the disclosed feeder assembly.

Referring additionally to FIGS. 9 and 12, pulley assemblies, 84, 86, and 88, are revealed with a belt, 90, fitting over pulley assemblies 84 and 86, while a belt, 92, fits over pulley assemblies 86 and 88, with tension pulley assemblies, 94 and 96 disposed, respectively, located between pulley assemblies 84 and 86, and pulley assemblies 86 and 88. Tension pulley assembly 96 tensions belt 92 while feeder assembly 50 is taking in cut material or running in a feeding direction. Should feeder assembly become clogged, for example, the belts can be run in a reverse direction to clear the clog, as described above, using reverse motor 59. While running in a reverse direction, tension pulley assembly 97 tensions belt 92.

Of course roller assemblies span transversely across feeder assembly 50 from each of the pulley assemblies, as described above. It should be noted that pulley assembly 84 has two different sized pulleys for speed adjustment, as does pulley assembly 86. By relieving the tension on belt 90, it can be moved between the two different sized pulleys, as described. A tension assembly, 98 (see FIGS. 7 and 12), moves roller assembly 55 forward and backward to adjust the tension of roller belts 56a, 56b, and 56c by a simple adjustment of a threaded bolt. Of course, rear roller assembly 52 receives power from belts 90 and 92 to drive roller belts 56a, 56b, and 56c.

Figure 21:
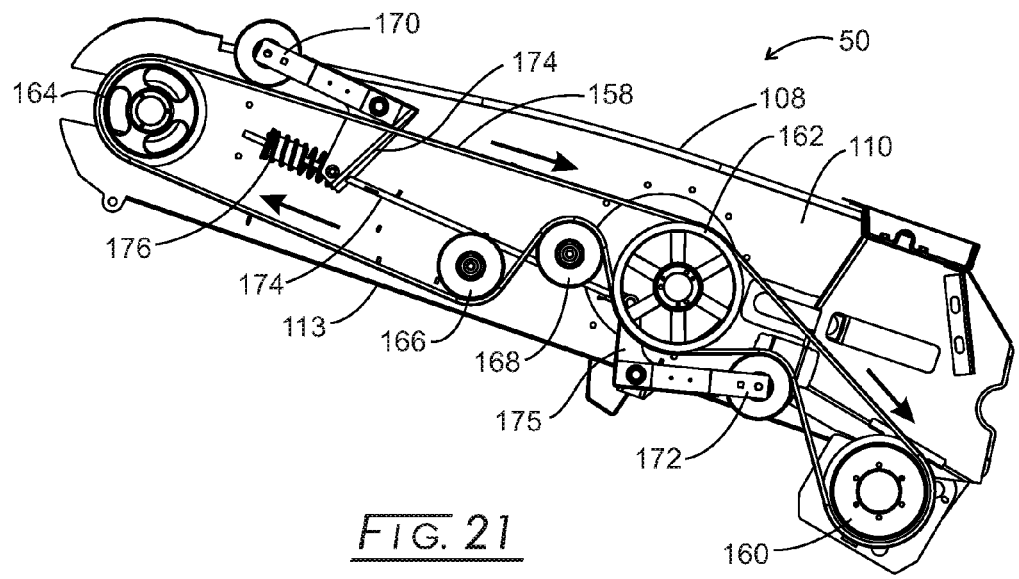
FIG. 21 is a side view of an alternative embodiment of the belt drive for the disclosed feeder assembly operating to take in harvested grain.
Figure 22:
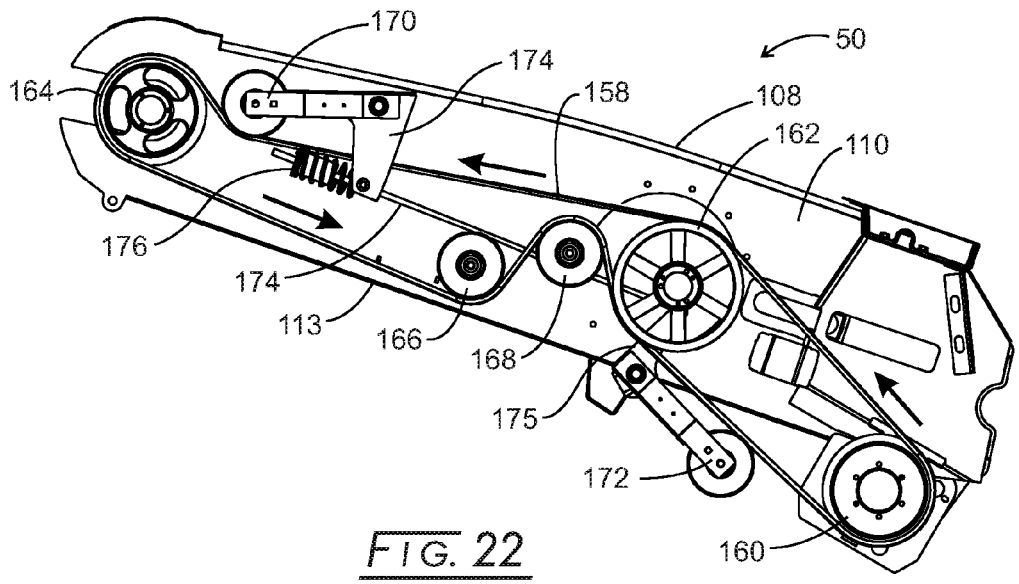
FIG. 22 is like FIG. 21, but with the belt running in reverse, such as to clear a clog in the disclosed feeder assembly.

An alternative embodiment for the belt drive system is seen in FIGS. 21 and 22, which alternative belt drive system uses a single belt, 158. In FIG. 21, the arrows indicate the direction of travel of belt 158 for feeding severed crop into feeder assembly 50 between bottom sheet 113 and cleated/slatted belts 56. Belt 158 surmounts pulley assemblies, 160, 162, and 164. Idler rollers, 166 and 168, are used to ensure sufficient contact of belt 158 against the lower portion of pulley assembly 162 for adequate rotation of drive roller 54. Pulley assemblies 160, 162, and 164 drive rollers 55, 54, and 52, respectively, as described above. This alternative and currently preferred belt drive system also makes use of a pair of tension pulley assemblies, 170 and 172, which are connected by a rod, 174, and levers, 171 and 175, with tension pulley assembly being biased by a spring assembly, 176. By virtue of rod 174 and levers 171/175, the tension pulley assemblies alternatively exert pressure on belt 158 depending upon the direction of travel of belt 158. For example, as shown in FIG. 21, belt 158 is moving in the direction of the arrows, which causes severed crop to be fed into feeder house assembly 50 and pulley assembly 172 to press against belt 158 and pulley assembly 170 is not press against belt 158. As shown in FIG. 21, belt 158 is moving in the direction of the arrows, which causes any severed crop inside feeder house assembly 50 that might be causing a clog to be moved forward and out of feeder house assembly. In such unclog mode, pulley assembly 170 presses against belt 158 and pulley assembly 172 does not press against belt 158.

Figure 18:
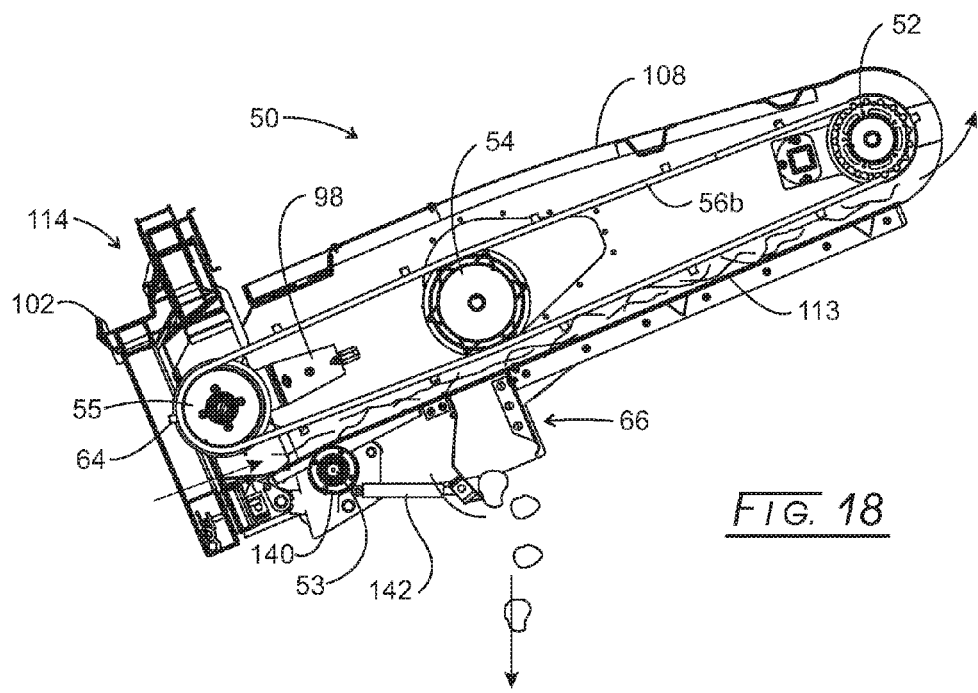
FIG. 18 is a side sectional view of the disclosed feeder assembly showing the rock beater door in an open position for dumping rocks accumulated in the sump.

In FIG. 11, we also see a gear box platform, 100, for gearbox 62; tension assembly 98; a hook assembly, 102, for grainhead 18; and pin holders, 104a and 104b, for locking grainhead 18 in position with pins (see FIGS. 18 and 19). Additionally, we see the sheet metal in which feeder assembly 50 is housed, as illustrated by sheet metal pieces, 106, 108, and 110 (see FIG. 12; bottom sheet (e.g. metal), 113, FIG. 16). Additionally, openings, 112A and 112B, provides access to rock beater roller assembly 54, such as in case removal of an object is required.

FIGS. 12, 13, 14, and 15, show a front-end assembly, 114, that provides a variety of functions or capabilities for feeder assembly 50, including, inter a/ia, side-to-side rotation of grainhead 18, heel-to-toe movement of grainhead 18, and retention/securing of grainhead 18 in position for grain harvesting. Front-end assembly 114 is composed of multiple components to be described below.

Tilting of front-end assembly 114 and, thus, grainhead 18 is achieved by use of cylinder assemblies, 118 and 120 (FIGS. 13 and 14), which use tube assemblies, 122 and 124 (FIG. 13), as the pivot point for such tilting. As best seen for tube assembly 124, such assembly consists of two concentric tubes placed within an aperture with one of the tubes being fixed while the other tube is free to rotate. The apertures actually are in a both fixed support or frame, 126, and a moving support or frame, 128, as seen in FIG. 14. The third major support of front-end assembly 114 is a frame, 130, which carries grainhead 18. Frames 126, 128, and 130 are nested together to form front-end frame assembly 114. Frame 128a of frame 128 has an arched saddle or curved dome, 131, at its top, which is coated with a friction-reducing material, such as a high-density polyolefin, that nests on frame 128b of arched or domed top 133. Frames 126 and 130 have similar arched or domed tops for nesting. Frame 128a is movable, while frame 128b is stationary. A pair of cylinders or linear actuators, 132 and 134, attached between frames 128a and 128b, so that frame 128a moves relative to frame 128b. Frame 130 carries grainhead 18, which concurrently rotates side-to-side along with frame 128a. Along with this rotation, the lower flat areas also move relative to each other, so a friction promoting material sheet, 136 (such as a high-density polyolefin, see FIG. 14), is placed therebetween also.

With respect to the movement of frames 128a and 128b with respect to each other, it will be appreciated that the center of rotation is well below ground. Cylinders 132/134 can be placed tangent to the arc of rotation, easing their power requirements. This is significant considering modern grain heads can be 50 feet (15+ meters) or more in length.

Figure 16:
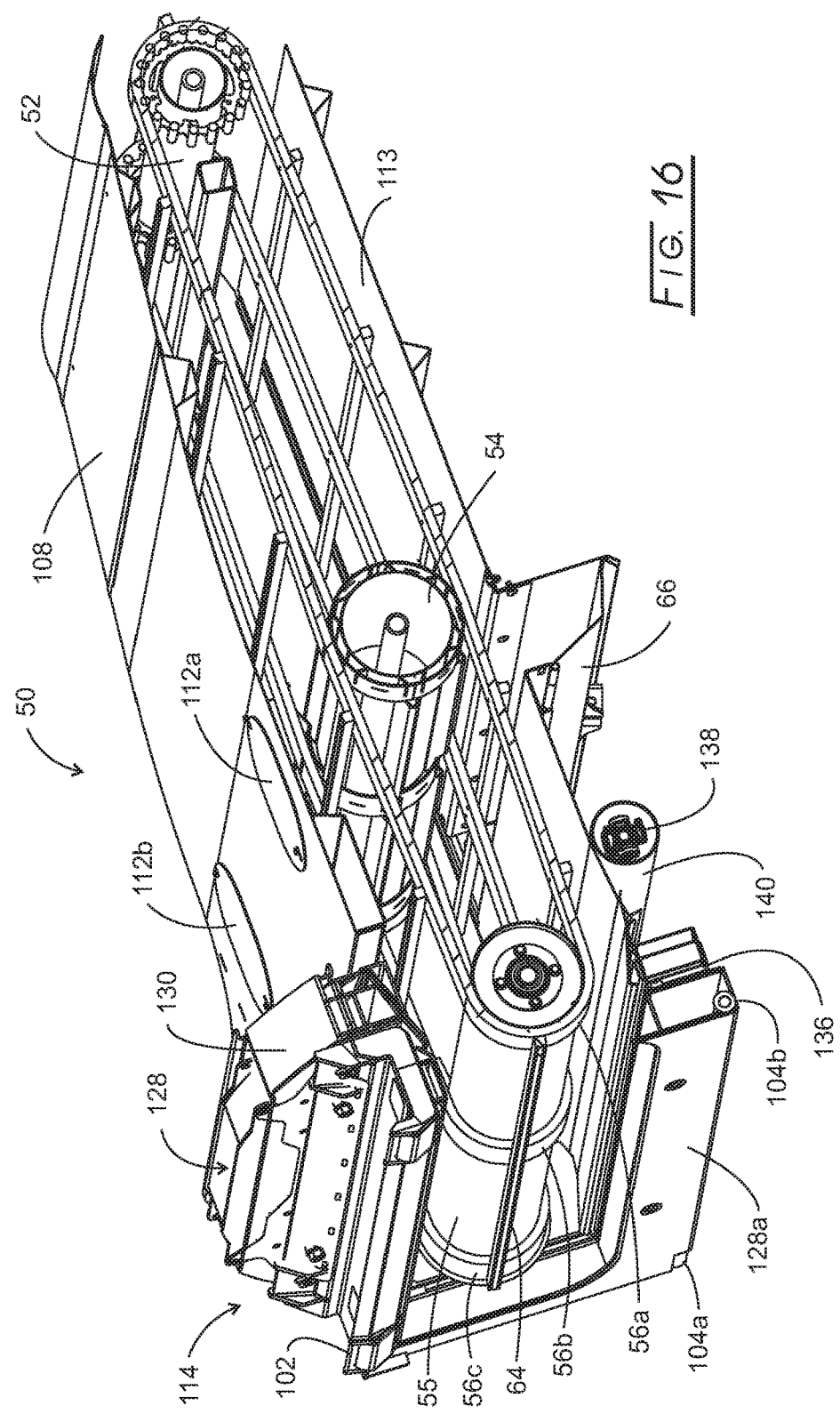
FIG. 16 is an isometric view like that in FIG. 11, but with the skin removed.

Looking now to FIG. 16, a joint assembly, 138, is connected to gearbox assembly 62. A rotating shaft, 53, housed within a tube, 140, connects gear 138 with pulley assembly 84 (see FIG. 12). The components housed within feeder assembly 50 also are revealed in FIG. 16. Rotating shaft 53 receives power from the drive shaft assembly. Belts drive rear roller 52 that power the feeder house conveyer assembly described herein.

Figure 17:
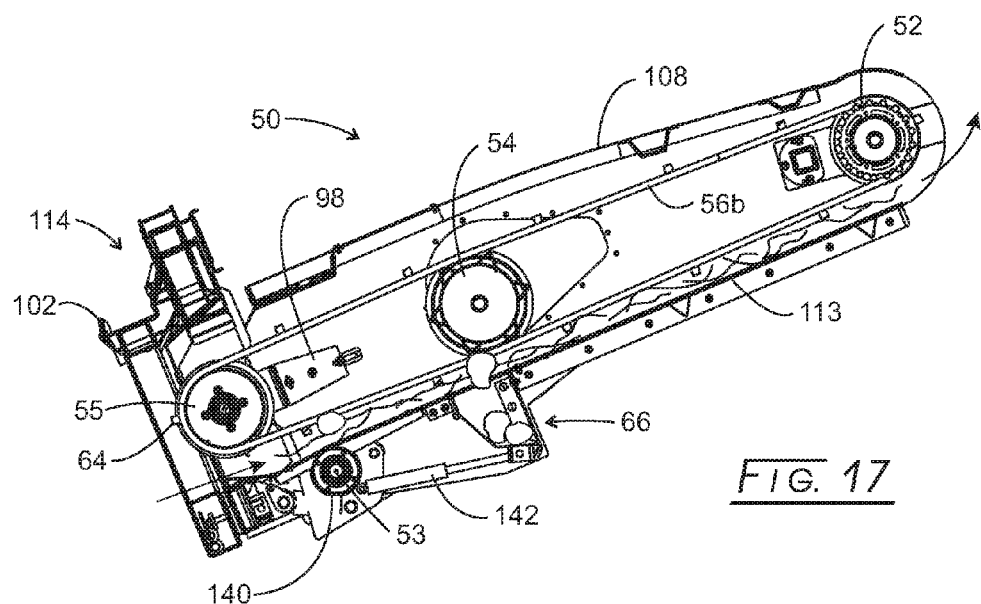
FIG. 17 is a side sectional view of the disclosed feeder assembly showing the rock beater door in an closed position for dumping rocks accumulated in the sump.

In FIGS. 17 and 18, mid-mounted rock beater roller assembly 54 is revealed in greater detail. Housed beneath such assembly is a reservoir, 66, usually formed from metal that accumulates rock and debris forced downwardly thereinto by rock beater roller assembly 54, as described above. A cylinder assembly, 142, operable remotely by the operator is actable to open the reservoir to dump its contents, such as at the end or side of the field being harvested. The forward position of the mid-mounted rock beater assembly 54 permits such easy dumping of its contents. Moreover, should debris become lodged within rock beater assembly 54, the operator can easily reach thereinto to remove such lodged rocks and debris.

Figure 13:
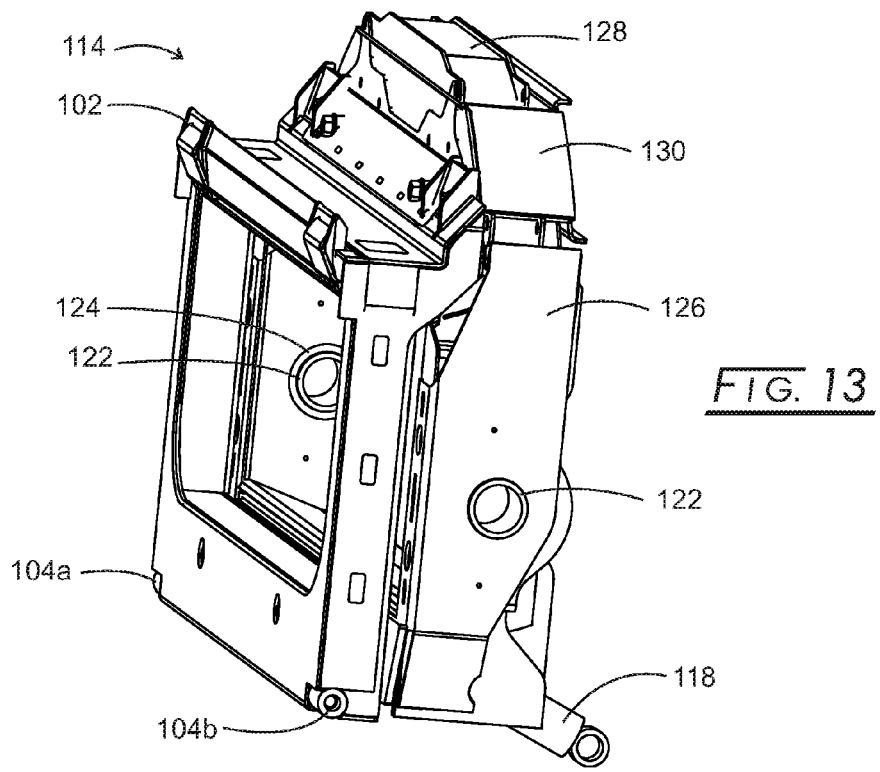
FIG. 13 an isometric view of the feeder face and header saddle or cradle.

As described in reference to FIG. 13, grainhead 18 can be locked into position and unlocked using pin holders 104a and 104b. FIGS. 19 and 20 show the locking mechanism therefor. In particular, the locking mechanism includes a linear actuator, 144, and a pair of elongate pins, 146 and 148. Linear actuator 144 is fixed at each end to one of the pins 146/148, but is otherwise unattached or free-floating. The other or free end of pin 146 can extend through pin holder 104a, while the free end of pin 148 can extend through pin holder 104b (not seen). A plate, 148 having an elongate slot is fixed to a bottom plate, 150, and is located adjacent to pin 146. A plate, 152, having an elongate slot is fixed to a bottom plate, 150, and is located adjacent to pin 148. Pin 146 carries a shorter pin, 154, that extends through the aperture in pin 148; while pin 148 carries a shorter pin, 156, that extends through the aperture in plate 152. Such short pins and apertured plate pairs prevent elongate pins 146/148 and linear actuator 144 from rotating. When linear actuator 144 is in an unextended or active state, elongate pins or rods 146/148 are in a retracted position so that grainhead 18 can pivot, as described above. However, when linear actuator 144 is in an extended or home state, elongate pins 146/148 extend through pin holders 104a/104b and lock grainhead 18.

While the device, assembly, and method have been described with reference to various embodiments, those skilled in the art will understand that various changes may be made and equivalents may be substituted for elements thereof without departing from the scope and essence of the disclosure. In addition, many modifications may be made to adapt a particular situation or material to the teachings of the disclosure without departing from the essential scope thereof. Therefore, it is intended that the disclosure not be limited to the particular embodiments disclosed, but that the disclosure will include all embodiments falling within the scope of the appended claims. In this application all units are in the US engineering system and all amounts and percentages are by weight, unless otherwise expressly indicated. Also, all citations referred herein are expressly incorporated herein by reference.

We claim:
1. An improved feeder house assembly, which comprises:
a front end header adapter assembly, comprising
(a) a front hook assembly for carrying a grainhead;
(b) a front header cradle assembly supporting the front hook assembly and comprising a pair of frame assemblies, each having mated top domed surfaces, one of the frame assemblies being stationary and the other frame assembly laterally tilting along the mated top domed surfaces along an arc of rotation by a pair of linear actuators located at either top side of the front end header adapter and connected to the other laterally tilting frame assembly tangential to the arc of rotation.

2. The improved feeder house assembly of claim 1, wherein the front end header cradle assembly has a pair of pivot assemblies located midway on either side of the front end header cradle assembly, and lower actuating assemblies located at each outer bottom side for pivoting the front end header cradle assembly about the pair of side pivot assemblies.

3. The improved feeder house assembly of claim 1, wherein one of the mated domed surfaces is coated with a lubricous material.

4. The improved feeder house assembly of claim 1, wherein the mated top domed surfaces are formed from metal requiring periodic lubrication.

5. The improved feeder house assembly of claim 1, wherein rollers are located under the mated top domed surfaces to carry the domed surfaces for their rotation.

6. The improved feeder house assembly of claim 1, wherein the linear actuators are located tangential to the arc of rotation.

\* \* \* \* \*